(12) United States Patent
Lytollis

(10) Patent No.: US 6,751,076 B2
(45) Date of Patent: Jun. 15, 2004

(54) PROTECTION OF INTRINSICALLY SAFE CIRCUITS

(75) Inventor: Barry James Lytollis, St. Albans (GB)

(73) Assignee: The MTL Instruments Group plc (GB)

(*) Notice: Subject to any disclaimer, the term of this patent is extended or adjusted under 35 U.S.C. 154(b) by 373 days.

(21) Appl. No.: 09/894,099

(22) Filed: Jun. 28, 2001

(65) Prior Publication Data

US 2002/0015273 A1 Feb. 7, 2002

(30) Foreign Application Priority Data

Jul. 6, 2000 (GB) .............................................. 0016524

(51) Int. Cl.$^7$ ................................................ H02H 9/00
(52) U.S. Cl. ...................................................... 361/56
(58) Field of Search ......................... 361/56, 58, 101, 361/93.1–9, 111, 120, 729

(56) References Cited

U.S. PATENT DOCUMENTS 4,638,396 A    1/1987   Mukli et al. ................. 361/101
6,034,611 A  * 3/2000   Brooks et al. ............... 340/647

FOREIGN PATENT DOCUMENTS

GB    1 491 522       11/1977
GB    2 033 681 A      5/1980

* cited by examiner

Primary Examiner—Gregory J. Toatley, Jr.
Assistant Examiner—Bori Benenson
(74) Attorney, Agent, or Firm—Woodcock Washburn LLP

(57) ABSTRACT

The protection of potentially incendiary circuits is achieved by a power system which comprises a power supply connected by power distribution wiring to one or more modules, the one or more modules each comprising an intrinsically safe circuit including a load, a sensor to detect the voltage supplied to the load, and a fast-acting switch arranged, in response to the detection of a decrease in the supplied voltage, to disconnect the load in such manner as to prevent any series break upstream from the switch from becoming incendiary.

13 Claims, 5 Drawing Sheets

US 6,751,076 B2

PROTECTION OF INTRINSICALLY SAFE CIRCUITS

FIELD OF THE INVENTION

This invention relates to the protection of intrinsically safe circuits, which are potentially incendiary. It is particularly concerned with the protection of intrinsically safe circuits which operate within hazardous areas, for example in the presence of flammable gases.

BACKGROUND OF THE INVENTION

In systems where power supplies feed a number of functional modules, where there may be the presence of flammable gases, there is a need to ensure that the system is safe. This means that the wiring between the power supplies and the modules must be protected in some way so that it is not incendiary, even if the modules are unplugged with the system running. One way to achieve this is to provide electronic power limiters in the output from each of the power supplies. These power limiters define the maximum output voltage and limit the short-circuit current. However, these power limiters are quite complex because they must meet the conflicting requirements of being precise yet operate fast. This complexity has to be duplicated to meet the requirements of other, more exacting systems.

SUMMARY OF THE INVENTION

It is an object of the present invention to provide a means of protecting potentially incendiary, intrinsically safe circuits using a simpler system than the relatively complex, conventional power limiters.

It is a further object of the invention to provide means whereby one affords complete protection to the wiring and to any plugs and sockets along the way. Desirably, provided that the inductance and capacitance limits are not exceeded, the wiring from the power supply to the modules is protected from open-circuit and short-circuit faults, so that no special construction is required.

In equipment or assemblies in which the wiring is well-controlled, the segregation between conductors can be controlled in the construction of the circuitry. If this segregation is made infallible, then short-circuit faults need not be considered and one only needs to protect against series breaks. For this, simpler protection schemes are adequate.

If one is concerned only with series breaks, then this removes the constraint to put the electronic protection upstream from the wiring to be protected. It simply has to be somewhere in series with the intrinsically safe circuit. The importance of this to achieving protection in accordance with the invention will be apparent from the description given hereinafter.

In accordance with the invention there is provided a method of protecting intrinsically safe circuits in which a voltage is supplied via a supply circuit to a load, which comprises sensing the voltage at the load and, in the event that a decrease in the said voltage is detected, disconnecting the load in such manner as to prevent any series break in the supply circuit from becoming incendiary.

Also in accordance with the invention there is provided apparatus for protecting an intrinsically safe circuit which includes a load and which is arranged to be supplied via a supply circuit with a voltage from power supply means, the apparatus comprising sensing means arranged to detect the said voltage, and switch means arranged, in response to the detection by the sensing means of a decrease in the said voltage, to disconnect the load in such manner as to prevent any series break in the supply circuit from becoming incendiary.

Also in accordance with the invention there is provided a power system for an intrinsically safe circuit, comprising power supply means, power distribution means connected to the power supply means, and at least one module connected to the power distribution means, the or each module comprising an intrinsically safe circuit including a load, sensing means to detect the voltage supplied to the load, and switch means arranged, in response to the detection by the sensing means of a decrease in the supplied voltage, to disconnect the load in such manner as to prevent any series break upstream from the switch means from becoming incendiary.

BRIEF DESCRIPTION OF THE DRAWINGS

In order that the invention may be more fully understood, a number of protection systems in accordance with the invention will now be described by way of example and with reference to the accompanying drawings. In the drawings.

DESCRIPTION OF THE PREFERRED EMBODIMENTS

Figure 1:
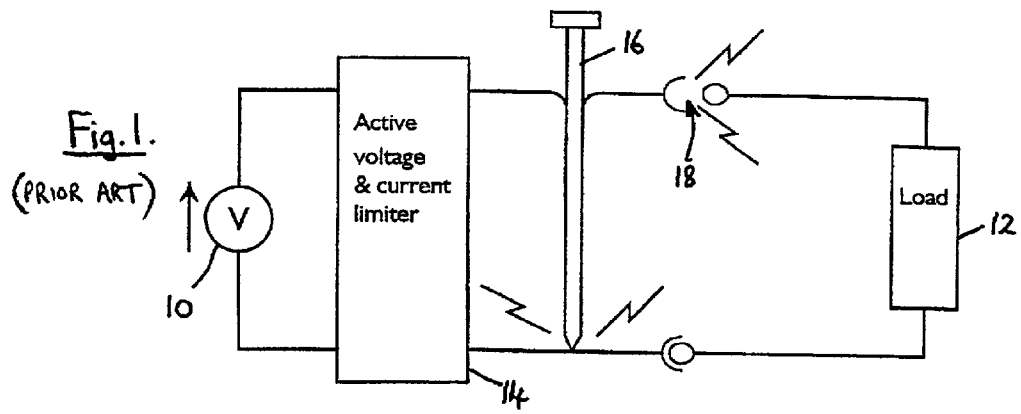
FIG. 1 shows a known example of the use of an active voltage and current limiter to protect against wiring shorts and breaks.

The circuit shown in FIG. 1, to illustrate the prior art, has a voltage supply 10, a load 12 and an active voltage and current limiter 14 upstream from the load. A pin 16 illustrates a short-circuit condition and a break in the wiring is indicated at 18. The active limiter 14 shown in FIG. 1 protects the load by limiting the voltage and current which is available to the circuit and keeping the values below a known incendiary limit. However, this is not strictly necessary. What is required is to restrict the voltage and current which is available to a developing spark to levels below the incendiary limit.

Figure 2:
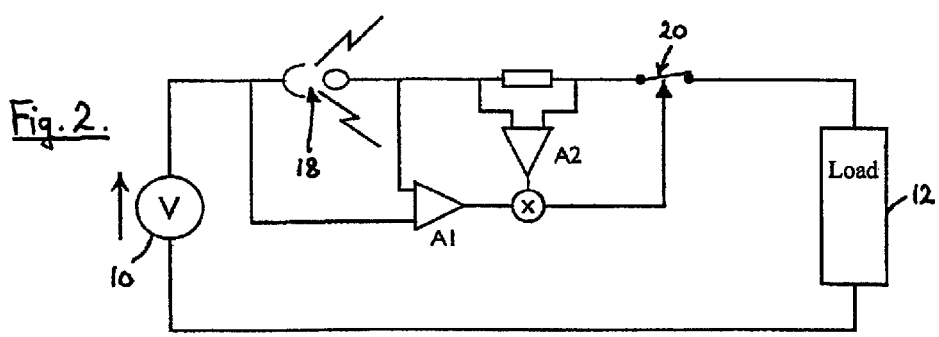
FIG. 2 illustrates the concept underlying the present invention, in which the voltage and current which is sensed upon a break in the wiring opens a switch.

FIG. 2 illustrates the concept underlying the present invention. A1 is a voltage sensor, sensing the voltage developed across the break 18 in the circuit. A2 is a current sensor, sensing the current flowing through it. The two sensors and A2 are combined in a manner which will enable a switch 20 to open before the V/I characteristic exceeds the incendiary limit. It is to be noted that the power available to the load 12 is not now constrained to be below the incendiary limit.

It is also to be noted that the circuit shown in FIG. 2 merely illustrates the concept underlying the present invention. In particular, only the wiring between the inputs of voltage sensor A1 is protected.

Figure 3:
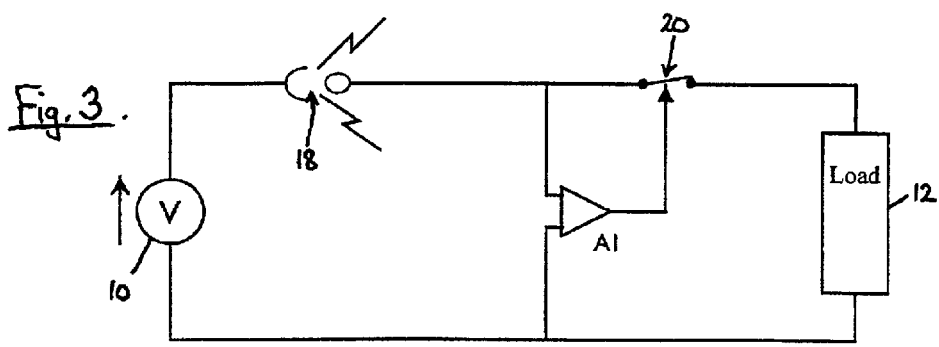
FIG. 3 is a circuit diagram showing a first embodiment in accordance with the invention.

FIG. 3 shows a first embodiment in accordance with the invention in which all of the circuit to the left-hand side of the voltage sensor A1 is now protected. Voltage sensor A1 now senses the voltage at the load end of the circuit, protecting all the wiring to its left. The voltage supply 10 is now added to the voltage sensed by voltage sensor A1, but is constant and allowance can be made for it. More importantly, the current sensor A2 is omitted and the output of the voltage sensor A1 is taken directly to the switch 20. It is known that for hydrogen, the most incendiary gas group, it is impossible to get ignition with a voltage which is less than about 8 volts at any current, provided that the current is insufficient to cause hot or molten metallic particles to be thrown off from the sparking contact. If the voltage which is allowed to develop across a breaking contact is restricted to less than 8 volts, then a precise current limit may not be required. In some apparatus, it may be possible to rely on the nature of the load 12 to determine the maximum current.

Figure 4:
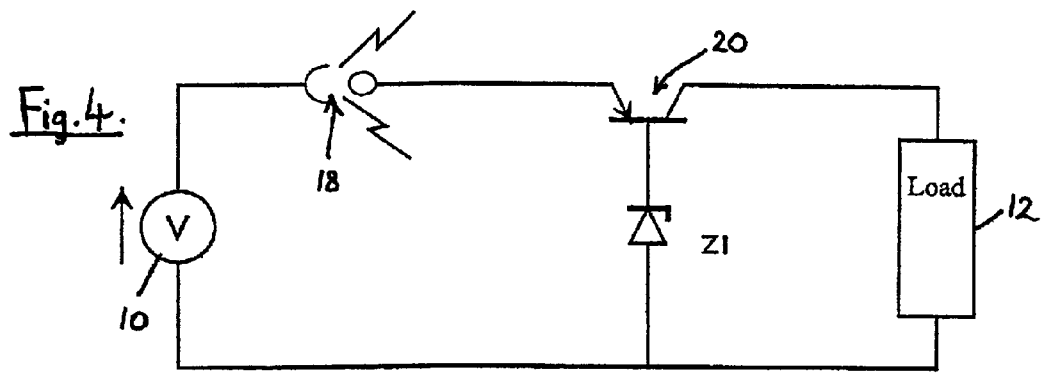
FIG. 4 shows a second embodiment in accordance with the invention using a transistor switch.

The circuit shown in FIG. 3 will only be effective if the voltage sensor A1 and the switch 20 are sufficiently fast. Experience in the use of active limiters suggests that the protection must operate within a few microseconds. Research has been reported which suggests that the minimum spark duration capable of causing ignition is around 8 $\mu$s. A transistor operating in a common-base configuration can be much faster than this and can be configured in a simple circuit which combines both the sensing and switching functions. FIG. 4 shows this in outline.

In FIG. 4 which shows a common-base transistor switch 20, a zener diode Z1 is connected to the base of the transistor. The voltage of zener diode Z1 is selected so that, when the circuit is unbroken, the supply voltage is present at the emitter of the switch 20 and base current is drawn through the zener diode Z1. The transistor switch 20 is turned hard on and current is fed to the load 12. If a break occurs, as indicated at 18, voltage is dropped across the break as a spark develops, resulting in the emitter voltage of the transistor 20 dropping. At a predetermined point, when the emitter voltage drops below the zener voltage, plus the emitter-base drop, the transistor 20 will turn off and disconnect the load 12.

Figure 5:
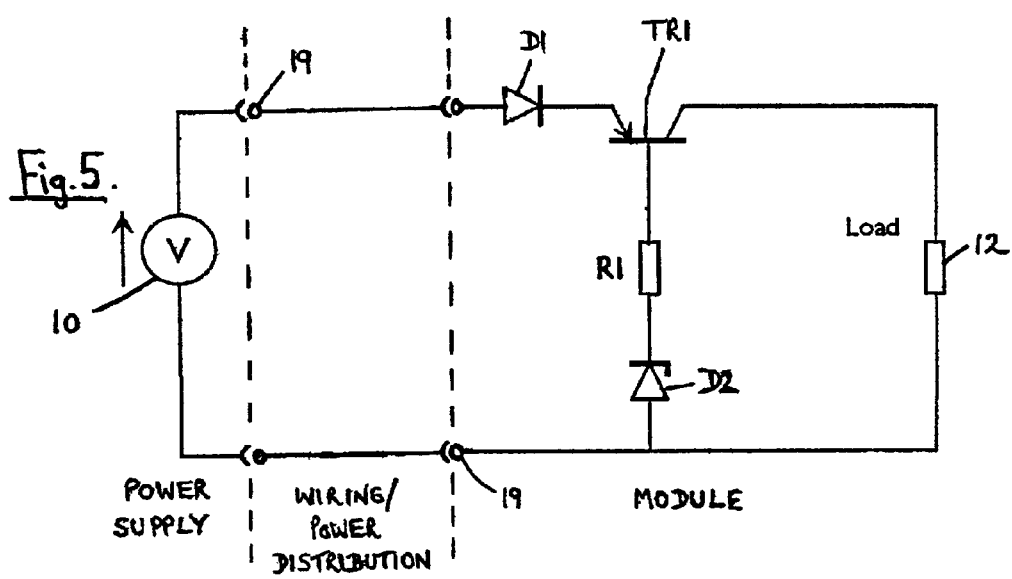
FIG. 5 shows a third embodiment in accordance with the invention.

FIG. 5 shows a third embodiment of the invention which embodies these principles. For clarity, and to improve the understanding of the invention, the power supply, the wiring/power distribution, and the module which incorporates both the load and the disconnection switch are indicated separately by the broken vertical lines. Plug connections 19 indicate that the parts of the system can be unplugged to cause a circuit break. A series diode D1 is connected between the emitter of transistor TR1 and the power supply 10. A resistance R1 is connected between the base of the transistor TR1 and a zener diode D2. A second resistance may be connected between the emitter and base of the transistor TR1. The resistance R1 limits the base current through transistor TR1 to about 15 mA.

If a break occurs to the left of TR1, D2 and R1, due either to a fault or a deliberate unplugging, the voltage at the emitter drops as voltage is developed across the break. The voltage of Zener diode D2 is chosen so that transistor TR1 turns off before the spark has developed sufficient energy to be incendiary. This basic circuit has been tested at 24V, 0.9A and found to be non-incendiary in hydrogen/air with a Zener diode voltage as low as 10V.

In one practical test circuit to this design, a load of 26 ohms was used, giving a load current of about 850 mA, which is normally incendiary in a constant current circuit down to around 12 volts or so.

The circuit was spark ignition tested according to EN 50020, using the 21% hydrogen in air explosive test mixture specified for group IIC gases. During this test, the power supply voltage was held constant at 24V, while the voltage of the Zener diode D2 was progressively reduced until ignition occurred. At the same time, resistor R1 was adjusted to maintain the current through Zener diode D2 to about 15 mA. The effect of reducing the Zener diode voltage in this way was to increase the voltage across the spark before transistor TR1 turns off.

There were no ignitions until the spark voltage exceeded about 12V, demonstrating that the circuit does provide the expected protection.

The construction of the wiring between the power supply and the module is controlled so that shunt faults cannot occur. Series faults (breaks) are rendered non-incendiary by the protection provided by the switch.

The power supply connection is protected just as is the module connection, so both the power supply and the module can be safely disconnected under power.

The circuitry to the right of transistor TR1 is not protected and so will be designed to be non incendiary using other techniques.

This protective circuit in accordance with the invention is very simple, inherently fast, and can be easily cascaded.

Figure 6:
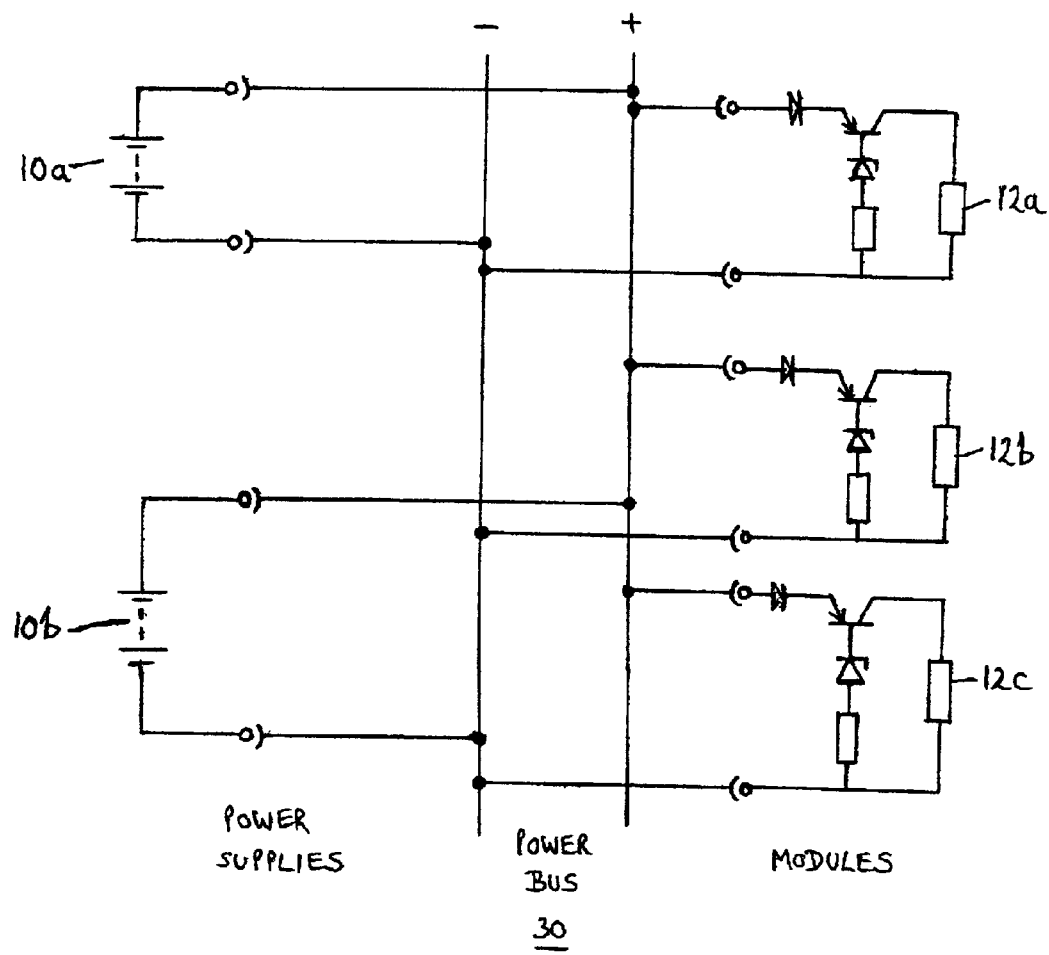
FIG. 6 shows a bussed power system in accordance with the invention.

FIG. 6 shows a bussed power system where one or more power supplies 10a, 10b (here two) are feeding a number of modules (here three) fitted to a backplane or power bus 30. The modules are shown with loads 12a, 12b, 12c.

The protection works equally well with multiple modules as with a single module. The effect of a break at a common point feeding several modules is equivalent to a break feeding a single module taking the same total current.

a) If a power supply 10a, 10b is disconnected, and the remaining power supply or supplies are able to maintain the bus voltage, then no spark will be developed at the break because no voltage will develop across it. This is so even without the switch protection of the present invention.

b) If a power supply 10a, 10b is disconnected and the bus voltage falls, a spark will develop at the break and the protection system of the invention will function to prevent it becoming incendiary.

The circuits described above are not tolerant of component faults, but are suitable for use in environments in which the flammable gas hazard is less severe. For Zone 1 environments, additional requirements are imposed. These include:

a) The circuitry to the right of TR1, D2 and R1 is unprotected by the switch and so the construction must protect any potentially incendiary currents in some other way. Full encapsulation is one possibility, but is rather inelegant. Alternatively, the current-carrying tracks could be made infallible up to the point where the circuitry branches and the current in each branch is limited by other means.

b) Each component on which intrinsic safety depends, which is most of them, must be run at two-thirds of its manufacturer's rating under all conditions of operation. (Unless a countable fault in a neighbouring component has occurred and the first component is no longer relied upon for intrinsic safety protection).

c) Protection must be maintained with one fault. Two switching circuits will be needed in cascade to achieve this.

Figure 7:
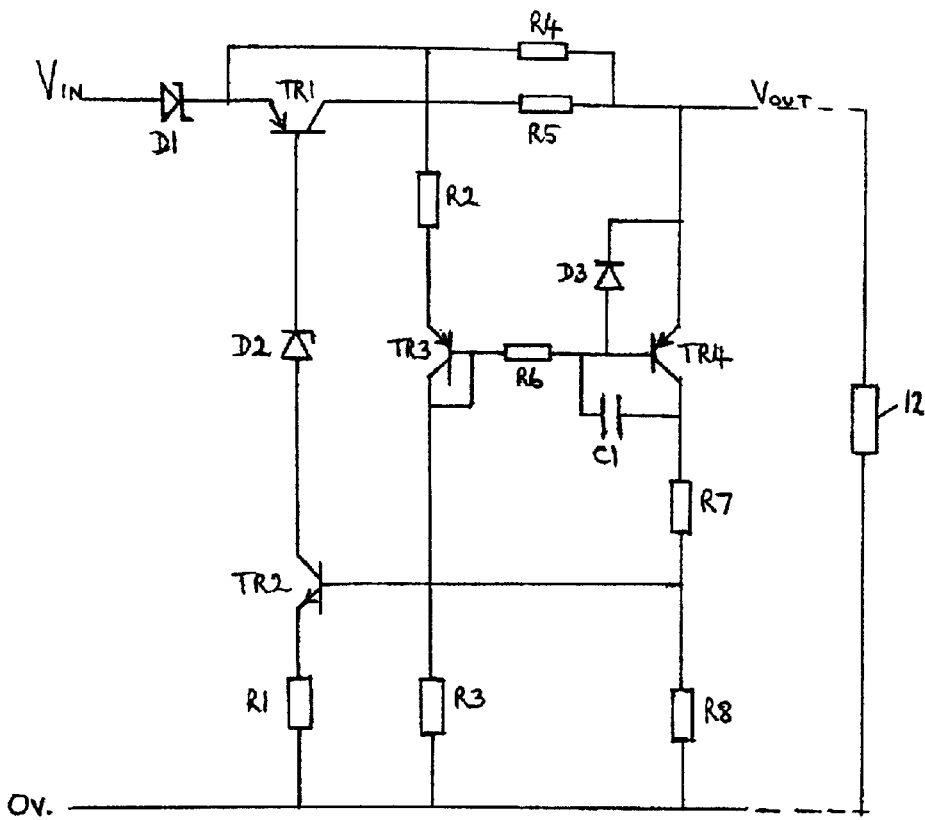
FIG. 7 shows a single-stage detection/switching circuit for use in a system in accordance with the invention.

FIG. 7 shows a single-stage detection/switching circuit for use in accordance with the invention. Being single-stage it has no fault tolerance, but it is easier to consider than a two-stage implementation.

The following target specification assumes a 24V system, each module drawing up to 0.5 A. 24V is a convenient supply voltage in many systems and it allows lower currents to be used, allowing more modules per bus for a given available bus current, and reduced voltage drops.

Target Specification

| | |
|---|---|
| Supply voltage range | 23 V to 24 V |
| Supply voltage safety limit | 26 V |
| Load voltage range | 21 V to 24 V |
| Minimum available load power | 10 W |
| Minimum available load current | 0.5 A |
| Input cut-off voltage | 20 V |

'Load' means the module circuitry which is fed by the protection circuit.

The input cut-off voltage is the minimum voltage at which the protection is guaranteed to operate.

Transistor TR1 and Zener diode D2 are the transistor and Zener diode as in FIG. 5. The remainder of the circuit essentially protects transistor TR1 from over-current and over-dissipation.

Transistors TR3 and TR4 act as a comparator, monitoring the sum of transistor TR1's Vce and the volt drop across a current sense resistor R5. A substantially constant reference voltage is generated across resistor R2 by the current drawn through resistor R2, transistor TR3, and resistor R3. In normal operation the emitter voltage of transistor TR4 is higher than that of transistor TR3 so transistor TR4 is switched on and the base voltage of transistor TR2 is set by the divider action of resistors R7 and R8 from the output voltage Vout.

Transistor TR2 and resistor R1 define the current through Zener diode D2 and the base of transistor TR1; about 5 mA for example. The Zener current in this circuit is more nearly constant compared to that in FIG. 5. Each of resistor R1, transistor TR2, and diode D2 can be rated to withstand a short-circuit fault in either transistor TR2 or diode D2.

If the total voltage developed across transistor TR1 and current-limit sense resistor R5 exceeds the reference voltage across resistor R2, then transistor TR4 and transistor TR2 turn off, turning off transistor TR1 to protect it from over-current or over-dissipation.

Once transistor TR4 is switched off, the circuit is latched with transistor TR1 off and Vout=0. Resistor R4 provides sufficient current to allow the circuit to restart, provided there is no significant load current until transistor TR1 is switched on.

Input diode D1 ensures that no backfeed is possible from energy stored in the load. It also unambiguously protects the base-emitter junction of transistor TR1 from reverse bias, which could occur under transient conditions.

Diode D3 protects the base-emitter junction of transistor TR4 from reverse bias when Vout is low. Resistor R6 restricts the current drawn from Vin through resistor R2 and diode D3.

C1 is a Miller capacitor to slow down the operation of transistors TR4 and TR3 to afford some immunity to transients. The current limit defined by resistor R5 is not to prevent sparking. It is primarily rating protection for transistor TR1 and so need be no faster than a fuse. This current limit also defines the maximum load current that the module can demand. It is closer protection than would be afforded by a fuse and thus benefits the design of the module circuitry for thermal safety.

An advantage of this circuit is that it protects transistor TR1 both against over-current and against over-dissipation. When Vin is healthy, transistor TR1 is hard on and dissipating very little. When Vin drops, transistor TR1 rapidly switches off and dissipates zero power.

The start-up of the system needs to be considered. Resistor R4 bleeds sufficient current into Vout to ensure start-up of the protection circuit. This current is kept as low as possible by running transistor TR3 and transistor TR4 at a relatively low collector current, 0.2 mA, so that resistor R4 is as large as possible. For the safety assessment, it is assumed that the load short-circuits Vout to 0V, so resistor R4 appears across Vin to 0V and the current through it is not switched by transistor TR1. Each module connected to a common bus would be assumed to draw that current and so the total current would depend on the number of modules. This total current has to be considerably less than the short-circuit current allowed by the resistive curves if it is not to compromise the spark protection of the system; 143 mA is the limit at 26 V.

Figure 8:
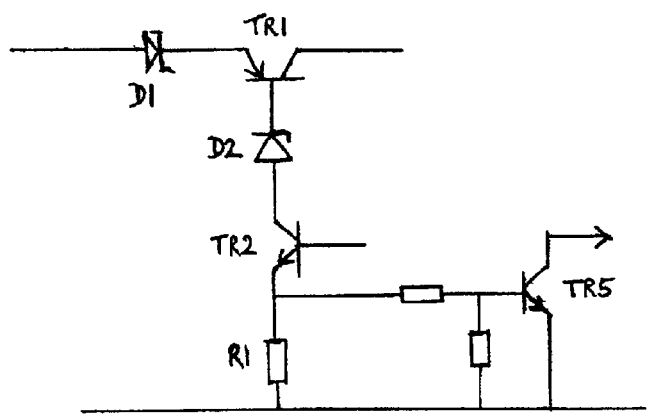
FIG. 8 shows a circuit used to assist in starting up of the system.

However, resistor R4 cannot provide enough current for start-up with the load connected, so the load must be switched in after start-up. FIG. 8 shows one way of doing this. Transistor TR5 senses the voltage across resistor R1 and provides an open-collector signal to an inhibit line on a power converter following. The threshold is set so that transistor TR5 switches on when adequate base current is being drawn from transistor TR1 to be certain that it is switched hard on.

Figure 9:
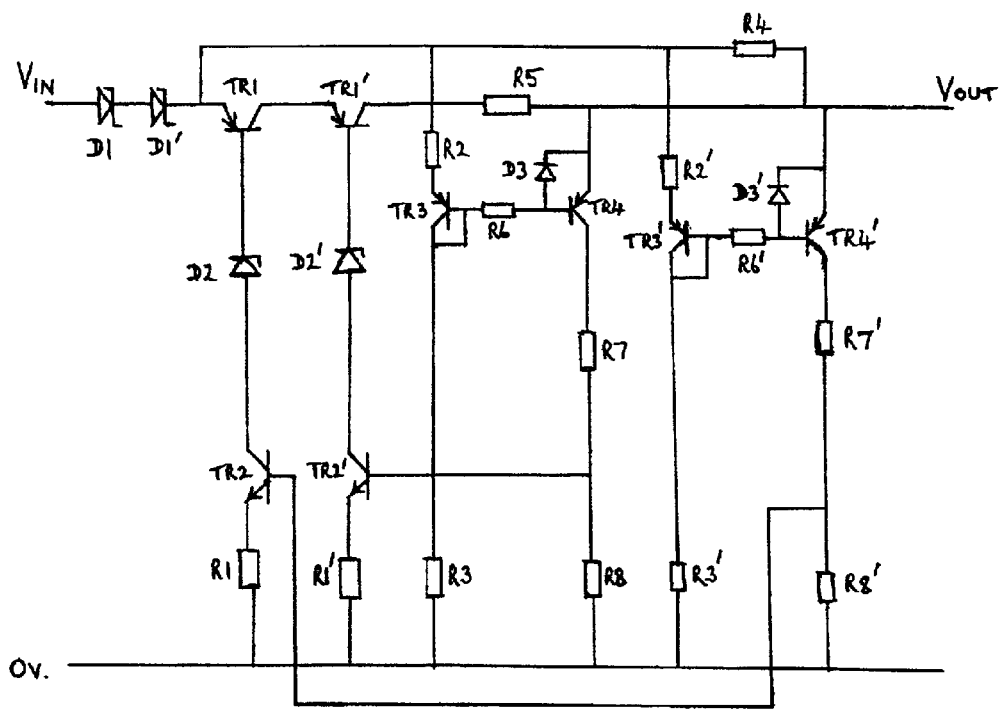
FIG. 9 shows how the circuit of FIG. 7 is duplicated in a cascade arrangement.

FIG. 9 shows how the circuit of FIG. 7 can be duplicated to provide one-fault safe protection for use in more severe environments. Two FIG. 7 circuits are essentially cascaded but there is a single current-sense resistor R5. The components in the "second" circuit which correspond to those in FIG. 7 are indicated by the same references with an added dash. Each of the two dissipation and over-current comparators senses the sum of the collector-emitter voltages of the two switching transistors TR1, TR1', and the IR drop in the current-sense resistor R5. Hence over-dissipation in either switching transistor, or over-current, causes both TR1 and TR1' to be turned off. The circuit is therefore safe with any single countable fault.

The protection system of the present invention has a number of advantages over known forms of protection.

i) As compared to expensive power supply limiters, the present invention requires only the addition of inexpensive components to the modules. They dissipate little power, even under fault conditions, so there is no great demand for the use of heat sinks.

ii) The power supplies are simple. Multiple modules can be fed through a bus system. No output current protection is necessary since the switching circuitry in the modules limits the total current that can be drawn.

iii) The protection system protects all the power systems upstream from the module against series breaks, both from faults and unplugging, including the power supply connections, so no special measures are required to protect the power bus against series breaks.

iv) Power is not restricted to non incendiary levels.

v) There is no disadvantage in using higher supply voltages. In fact, efficiency and available power increases at higher voltages.

vi) The only protection required in the power supplies is to limit the output voltage.

While the present invention has been described with reference to particular embodiments, those skilled in the art will recognise that many changes may be made thereto without departing from the spirit and scope of the present invention.

What is claimed is:

1. A method of protecting intrinsically safe circuits in which a voltage is supplied via a supply circuit to a load, which comprises sensing the voltage at the load and, in the event that a decrease in the voltage is detected, disconnecting the load so that a series break in the supply circuit, upstream from the point of disconnection and causing the decrease, is prevented from becoming incendiary.

2. A method according to claim 1, in which a plurality of loads are fed from one or more power supplies via a common power bus.

3. A method according to claim 1, which comprises incorporating means to sense the voltage and means to disconnect the load into a module which includes the load.

4. A method according to claim 3, which comprises protecting the means to disconnect the load from over-current.

5. A method according to claim 3, which comprises protecting the means to disconnect the load from over-dissipation.

6. Apparatus for protecting an intrinsically safe circuit which includes a load and which is arranged to be supplied via a supply circuit with a voltage from power supply means, the apparatus comprising sensing means arranged to detect the voltage, and switch means arranged, in response to the detection by the sensing means of a decrease in the said voltage, to disconnect the load in such manner as to prevent any series break upstream from the switch means from becoming incendiary.

7. Apparatus according to claim 6, in which the sensing means and the switch means are incorporated into a module which includes the load, with the sensing means and the switch means being on the supply side of the load.

8. Apparatus according to claim 6, in which the sensing means comprises a Zener diode.

9. Apparatus according to claim 6, in which the switch means comprises a transistor switch.

10. Apparatus according to claim 6, which comprises means to protect the switch means from over-current.

11. Apparatus according to claim 6, which comprises means to protect the switch means from over-dissipation.

12. A power system for an intrinsically safe circuit, comprising power supply means, power distribution means connected to the power supply means, and at least one module connected to the power distribution means, the at least one module comprising an intrinsically safe circuit including a load, sensing means to detect a voltage supplied to the load, and switch means arranged, in response to the detection by the sensing means of a decrease in the voltage supplied, to disconnect the load in such manner as to prevent any series break upstream from the switch means from becoming incendiary.

13. A power system according to claim 12, in which the power supply means comprises one or more power supplies, and the power distribution means comprises a power bus connected to a plurality of module.

* * * * *